3,787,563
PROCESS FOR PURIFYING SULFURIC ACID FOR THE CATALYTIC SYNTHESIS OF HYDROXYL‑AMMONIUM SULFATE
Klaus Kartte, Frankenthal, Kurt Jockers and Hermann Meier, Ludwigshafen and Ludwig Taglinger, Gruenstadt, Germany, assignors to Badische Anilin- & Soda-Fabrik Aktiengesellschaft, Ludwigshafen (Rhine), Germany
No Drawing. Filed Mar. 3, 1972, Ser. No. 231,721
Claims Priority, application Germany, Mar. 9, 1971,
P 21 11 118.2
Int. Cl. C01b *17/90, 31/02*
U.S. Cl. 423—531      3 Claims

ABSTRACT OF THE DISCLOSURE

Process for the purification of sulfuric acid to be used in the manufacture of hydroxylammonium sulfate by reduction of nitric oxide in contact with platinum catalysts. The process consists in diluting the sulfuric acid with water, adding such an amount of sulfur dioxide that after treatment with activated carbon it still has a content of at least 5 mg. of $SO_2$ per liter of dilute acid and then treating the sulfuric acid together with air, oxygen or hydrogen peroxide again with activated carbon. The activated carbon can be regenerated by treatment with alkaline substances such as caustic soda solution, aqueous ammonia solution or sodium carbonate solution.

---

This invention relates to a process for purification of sulfuric acid which shall be used especially in the production of hydroxyl ammonium sulfate by reduction of nitric oxide.

In the production of hydroxylammonium sulfate by catalytic reduction of nitrogen monoxide with hydrogen in dilute sulfuric acid in contact with a suspended platinum catalyst, special purity requirements are placed on the sulfuric acid. Small amounts of organic impurities and also traces of heavy metals such as mercury, selenium or arsenic in the acid are retained on the active surface of the catalyst suspended in the dilute acid and result in poisoning and consequently in a shortened life of the catalyst.

A process for purifying dilute commercial sulfuric acid in which dilute sulfuric acid is passed with a small amount of hydrogen sulfide over activated carbon is known from German Patent 1,124,024. The content of organic impurities and heavy metals in the sulfuric acid is thus decreased.

We have now found that the disadvantages of this purification method, particularly deposition of sulfur on the carbon and the resultant short life of the activated carbon are avoided by adding to the sulfuric acid, after dilution with water, such an amount of sulfur dioxide that the dilute sulfuric acid still has a content of 5 mg. of $SO_2$ per kg. of $H_2SO_4$ after the treatment with activated carbon, and then treating the sulfuric acid, together with air, oxygen or hydrogen peroxide, again with activated carbon.

Normally commercial concentrated sulfuric acid already contains small amounts of dissolved sulfur dioxide. These amounts are however insufficient for the purification of the sulfuric acid, particularly when the water used for dilution contains oxidizing constituents, for example dissolved air, or the sulfuric acid originates from a process in which it is contaminated by oxidizing substances.

When there are only insignificant amounts of oxidizing substances present in the sulfuric acid or diluting water to be used, or none at all, small amounts of sulfur dioxide are sufficient to add to the dilute acid prior to the treatment with active carbon. Since this amount can generally only be determined by analytical methods or varies, it is more advantageous to regulate the addition of sulfur dioxide so that the dilute acid contains at least 5 mg. of $SO_2$ per liter after the first active carbon treatment.

It is surprising that sulfuric acid which has been treated with activated carbon in the presence of sulfur dioxide should give better results in the catalytic hydroxylamine method than the prior art treatment with activated carbon and hydrogen sulfide. This result is attributable to the fact that the srongest poisons for the platinum catalyst, namely mercury and selenium, are completely retained by the activated carbon in the presence of sulfur dioxide.

Organic impurities are also retained by the process of the invention from sulfuric acid to be purified, in the same way as in the treatment with hydrogen sulfide and carbon.

Since sulfur dioxide itself is a poison for the platinum catalyst the excess $SO_2$ present has to be removed quantitatively before introduction of the acid into the hydroxylamine production process. This can be done in an advantageous manner by adding oxidizing substances such as hydrogen peroxide, oxygen or air, and passing the purified sulfuric acid still containing sulfur dioxide over activated carbon together with the said substances. In addition to removal of the sulfur dioxide, the said treatment also achieve a saturation (according to the partial pressure) of the acid with oxygen so that the same effect is achieved as by an oxidizing pretreatment, for example according to German Pat. 921,145.

A major advantage of the process according to the invention consists however in the fact that the active carbon can be used practically for an unlimited time. When after prolonged use the carbon has become too strongly contaminated with organic substances, it can be purified by a simple treatment with dilute aqueous alkalies such as caustic soda solution, aqueous ammonia solution or sodium carbonate solution. Not only are the organic impurities but also mercury and selenium colloidally dissolved off from the carbon. In the prior art method of purification with active carbon and hydrogen sulfide, the activated carbon not only becomes inactive considerably more quickly but is also very difficult to regenerate. The pores of the activated carbon are clogged up fairly quickly by the separating sulfur.

The process of the invention is preferably carried out in two consecutive towers filled with activated carbon, the first tower serving to purify the acid, and the oxidation of the residual sulfur dioxide to sulfuric acid and the oxidizing pretreatment of the dilute sulfuric acid being carried out in the second tower.

The concentration of the sulfuric acid for the catalytic hydroxylamine production, which is set up by dilution with water prior to the treatment with activated carbon, can be varied within wide limits. The lower limit is set by the necessity for a certain minimum concentration of hydroxyammonium sulfate to be achieved. The lower limit of the concentration of the dilute sulfuric acid should advantageously not go below a concentration of from 5 to 10% by weight. Difficulties in carrying out the process arise on the other hand above 50% by weight of $H_2SO_4$ because of the high viscosity. A high concentration of sulfuric acid is not necessary for the catalytic hydroxylamine process because of the equivalent hydroxylammonium sulfate concentration under the operating conditions would be above the saturation concentration. The dilution of 20% by weight has proved to be advantageous.

The following examples may serve to illustrate the process.

EXAMPLE 1

A concentrated nulfuric acid containing:

0.8 mg. of Hg per kg./cc. of $H_2SO_4$, and
1.2 mg. of Se per kg./cc. of $H_2SO_4$ is diluted with water to 20% by weight and, prior to passing it over activated carbon, such an amount of $SO_2$ is added that after separation of the activated carbon 10 mg. of $SO_2$ per liter is still contained in the dilute sulfuric acid.

The acid purified in this way is then passed together with oxygen over a second bed of activated carbon to remove the excess sulfur dioxide.

The mean residence time in the first bed of carbon is about eight minutes and in the second about two and a half minutes.

The dilute acid treated in this way contains less than 0.010 mg. of Hg per kg./cc. of $H_2SO_4$ and less than 0.1 mg. of Se per kg./cc. of $H_2SO_4$. When it is used in the catalytic hydroxylamine process, no decline in the effectiveness of the catalyst can be detected after four weeks.

If the same treatment is carried out with the same sulfuric acid but omitting the addition of $SO_2$, a decline of the effectiveness of the catalyst to about 50% of the original effectiveness is evident after three days in the catalytic hydroxylamine process.

EXAMPLE 2

The starting acid is a 70% sulfuric acid originating from a process in which highly concentrated nitric acid is prepared from dilute nitric acid by means of sulfuric acid. This sulfuric acid contains 0.02% by weight of $HNO_3$ (with reference to the 70% $H_2SO_4$) in addition to the impurities specified in Example 1.

The procedure of Example 1 is followed except that 55 mg. of $SO_2$ per liter is added to the dilute acid before it passes over the carbon so that after it has passed over the carbon the acid contains an excess of about 10 mg. per liter.

Mercury and selenium can no longer be detected microanalytically in the acid after this purification.

The acid is then passed with oxygen over a second bed of carbon to remove the excess of $SO_2$.

When the acid is used in catalytic synthesis of hydroxylamine there is no decrease in the effectiveness of the catalyst after four weeks.

When on the other hand the acid is subjected to the same purification process but without adding $SO_2$, the effectiveness of the catalyst declines to 50% of the original level after only two days.

We claim:
1. A process for purification of sulfuric acid solution to be used for the production of hydroxylammonium sulfate by reduction of nitric oxide in contact with a platinum catalyst in suspension in sulfuric acid, said sulfuric acid containing as impurities therein at least one of mercury, selenium and organic impurities, which process comprises adding sulfuric dioxide to said sulfuric acid solution having a concentration of 5–50% by weight, contacting the resultant sulfuric acid solution with activated carbon to remove from the solution the aforesaid mercury, selenium and organic impurities, the amount of sulfur dioxide added being sufficient to provide in the resultant activated carbon-treated sulfuric acid solution at least 5 mg. of $SO_2$ per liter after said contact, thereafter adding to the resultant dilute sulfuric acid solution either air, oxygen or hydrogen peroxide to oxidize the sulfur dioxide, and thereafter contacting the resultant dilute sulfuric acid solution with activated carbon.

2. A process as claimed in claim 1 wherein the activated carbon which has become contaminated by the mercury, selenium and organic impurities is regenerated by contact with a dilute solution of an alkaline substance to remove from the activated carbon the mercury, selenium and organic impurities.

3. A process as claimed in claim 2 wherein said alkaline substance is caustic soda, ammonia, or sodium carbonate.

References Cited

UNITED STATES PATENTS

| | | | |
|---|---|---|---|
| 2,655,431 | 10/1953 | Allen et al. | 423—522 |
| 3,145,080 | 8/1964 | Jockers et al. | 423—531 |
| 3,294,487 | 12/1966 | Pauling | 423—522 |
| 1,780,154 | 11/y930 | Gardner | 423—461 |
| 3,578,390 | 5/1971 | Kruel et al. | 423—525 X |

FOREIGN PATENTS

| | | | |
|---|---|---|---|
| 345,220 | 9/1929 | Great Britain | 423—531 |

JACK COOPER, Assistant Examiner

U.S. Cl. X.R.

423—461, 525